Feb. 28, 1928.
C PAYNE
1,661,009
GYPSUM BUILDING BLOCK
Filed May 28 1925
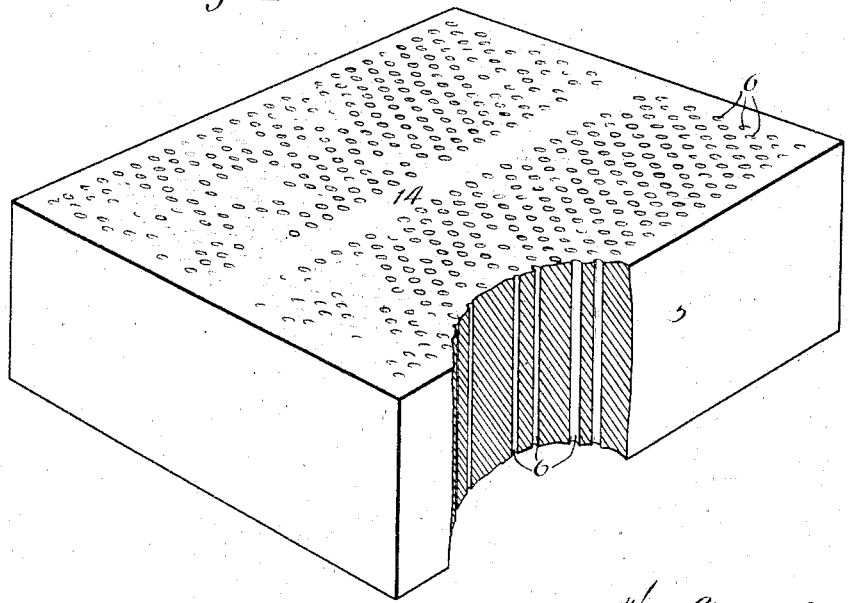
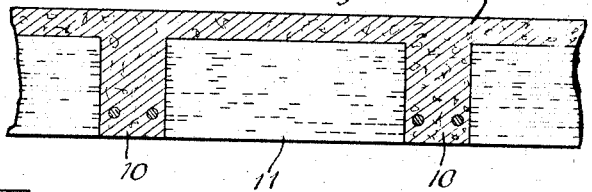
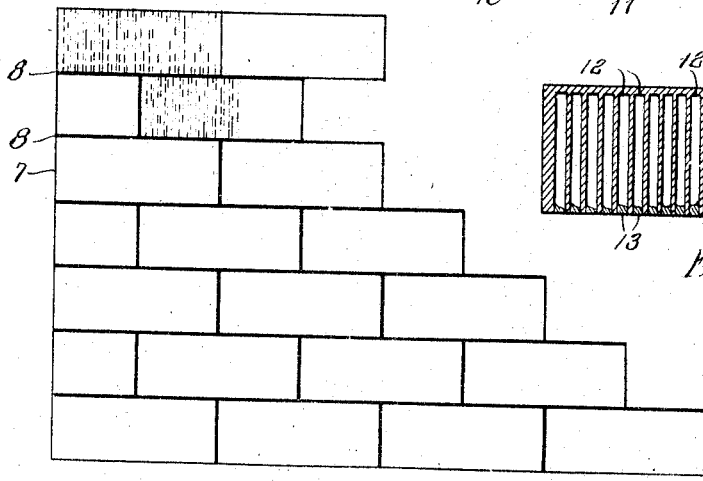
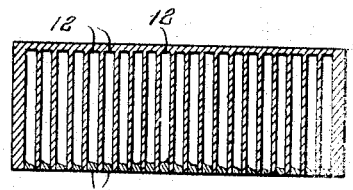
Inventor
Caleb Payne
By Wm O Bell Patented Feb. 28, 1928.

1,661,009

UNITED STATES PATENT OFFICE.

CALEB PAYNE, OF CHICAGO, ILLINOIS, ASSIGNOR TO GYPSUM ENGINEERING & MANUFACTURING COMPANY, OF CHICAGO, ILLINOIS, A CORPORATION OF ILLINOIS.

GYPSUM BUILDING BLOCK.

Application filed May 28, 1925. Serial No. 33,328.

The object of this invention is to provide a gypsum building block for building purposes generally, and which can be advantageously used in place of brick, terra cotta tile and other materials for backing up stone and other walls, and also in place of metal or other tile or forms used in making cement floors.

Another object of the invention is to provide a strong and substantial building block, light in weight, which can be made of uniform size and laid with a smooth plastering surface, thereby dispensing with the necessity for a rough plaster coat.

And a further object of the invention is to make a building block of gypsum stucco, which is inherently insulating, and to provide the block with a great number of comparatively small perforations extending in parallel relation through the block, the ends of which perforations will be closed by contact of the perforated faces of the block with plain surfaces, or by mortar used in laying the blocks one upon the other, whereby the perforations constitute dead air spaces and increase the insulating properties of the block.

And a still further object of the invention is to facilitate the manufacture of gypsum building blocks by providing the block with a large number of comparatively small parallel perforations extending through the block, whereby the block will dry quickly because of the large surface area exposed.

In the accompanying drawings illustrating the invention

Fig. 1 is a perspective view of a block.

Fig. 2 is a fragmentary view of a wall composed of the blocks,

Fig. 3 is a sectional view illustrating a cement floor made with the blocks; and Fig. 4 is a detail view showing a block like that of Fig. 1 but on a smaller scale and with the perforations sealed at their ends.

The block 5 is made of gypsum stucco and it is provided with a great number of perforations 6 extending in parallel relation through the block from one face to another. I call this a "perforated block" and I mean by this to distinguish it by reason of the large number of comparatively small perforations from tile and other blocks which have one or several large openings therein. Such tile or other blocks are common articles of commerce to-day, but they are entirely different from my block in essential respects, both in construction and in uses, and I think this is well indicated by the term "perforated" as I use it. This term also distinguishes my improved block from blocks which might be provided with such irregular openings as are found in sponge or sponge rubber because a block made like a sponge or sponge rubber would not have the strength and stability of my perforated block. The perforations may be $\tfrac{5}{16}$ inch or $\tfrac{3}{8}$ inch in diameter and the walls between the holes may thin down to $\tfrac{1}{16}$ inch or $\tfrac{1}{8}$ inch. I have made the perforations of uniform size and have arranged them in regular rows, but it may be found convenient and desirable for some purposes to vary the size of the openings in a block or to arrange them otherwise than in regular rows. The walls of the perforations form arches which cooperate with each other and make a block which is strong and substantial and has relatively great crushing strength. This block is far better adapted for use as a filling material in backing up walls, as forms for making cement floors, and for other purposes than the materials now used, because it can be made of uniform size and shape, its strength as compared with its weight, its superior insulating properties, and the plastering surface which it supplies.

In building a wall 7 I prefer to lay the blocks one upon the other with the perforations running vertically through the blocks. It is possible, of course, to stagger the blocks so that the perforations of each block will be sealed, or substantially so, at their ends by adjacent blocks, but I find it more practical to lay the blocks in gypsum mortar 8 which will seal the perforations besides holding the blocks in place.

In building a cement floor 9 the blocks will be supported by form work like tile are now commonly supported, and the cement floor built thereon with the blocks seated between the beams 10 and forming a plastering surface 11 flush with the surface of the beams. The gypsum blocks constitute a substantial insulating protection for the cement floor since it is well known that the insulating property of gypsum stucco is many times greater than that of cement. I prefer that the perforations should run horizontally in the blocks used in floors, but this is not absolutely necessary since the plaster coat will seal the lower ends of the perforations, if they run vertically.

The block is highly desirable as a building material because it can be made to uniform size and shape, with smooth surfaces and be laid or built up to provide a smooth plastering surface. It is also important because, being free from metal or other forms of reinforcement, it can be easily cut or sawed to any size or shape as may be desired. By reason of its light weight, and comparatively low cost, it can be used with great satisfaction in building cement floors, not only because it constitutes a form which can be easily handled and arranged in place, but because of the advantages which it presents as a permanent part of the wall, notably its insulating property and the plastering surface which it affords. This makes a superior floor without increasing the cost materially, if at all.

The great number of perforations, which may be said to be finely divided and widely distributed, increase the exposed surface of the block to such an extent that it will air-dry rapidly, and therefore can be made quickly and at comparatively low cost. This is an important feature because it eliminates the necessity for kiln drying, insures uniform drying throughout the body of the block, and makes it possible to produce a block in short time, thereby at a comparatively low cost.

I have described how the perforations in the blocks are sealed at their ends when the blocks are used in building a wall and in floor work, and it will be understood that the mortar used in setting up the blocks will almost always accomplish the purpose of sealing the perforations at their ends. It may be desirable for some purposes, or to absolutely assure sealing of the perforations, to apply a light coat of gypsum mortar or other suitable material to the perforated faces of the block to seal the block in the manufacture thereof, in a somewhat similar manner to the application of gypsum mortar to the block in laying a wall. And it may be found expedient to make a block as shown in Fig. 4 with the perforations terminating at 12, adjacent to one face of the block so that they will be sealed at this end, after which the other ends of the perforations may be sealed when the block is laid or by the application of a gypsum mortar which needs only be sufficient to seal the lower ends of the perforations, as indicated at 13 in Fig. 4.

The block may be provided within its margins with perforations throughout its body or one or more solid sections such as 14 may be provided to increase the strength in cases where it may be desirable.

I employ cores for making the perforations, and have found that the cores can be located very closely together, and thus make a block with a great number of comparatively small perforations very close to each other; but I do not wish to be restricted to any particular size or number of perforations in such a perforated block as I have heretofore described, and I reserve the right to make all such changes in the use of the invention as may be covered by the following claims.

I claim:

1. A gypsum building block having a rectangular body with multitudinous comparatively small perforations extending completely through the block and separated from each other by comparatively thin walls, each perforation being separated from the others and of such size and so spaced as to occur at relatively close intervals to occupy a substantial portion of the surface area of the said body.

2. A gypsum building block having a substantially rectangular body with multitudinous perforations closely arranged and separated by relatively thin walls to produce a honeycombed block, in which the perforations occupy a substantial portion of the surface area of the block.

3. A gypsum block comprising a substantially rectangular body having two series of perforations separated by a web extended across the face of the block, each of said series of perforations comprising a multitudinous number of small substantially circular openings separated and defined by comparatively thin walls, such perforations being of such size in proportion to the block as to comprise approximately one half of the cross sectional area thereof, said perforations being in staggered relationship.

CALEB PAYNE.